United States Patent
Glazistov et al.

(10) Patent No.: US 11,893,681 B2
(45) Date of Patent: Feb. 6, 2024

(54) METHOD FOR PROCESSING TWO-DIMENSIONAL IMAGE AND DEVICE FOR EXECUTING METHOD

(71) Applicant: Samsung Electronics Co., Ltd., Suwon-si (KR)

(72) Inventors: Ivan Viktorovich Glazistov, Ulyanovsk (RU); Ivan Olegovich Karacharov, Moscow (RU); Andrey Yurievich Shcherbinin, Moscow (RU); Ilya Vasilievich Kurilin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/294,193

(22) PCT Filed: Dec. 6, 2019

(86) PCT No.: PCT/KR2019/017240
§ 371 (c)(1),
(2) Date: May 14, 2021

(87) PCT Pub. No.: WO2020/122513
PCT Pub. Date: Jun. 18, 2020

(65) Prior Publication Data
US 2022/0005266 A1  Jan. 6, 2022

(30) Foreign Application Priority Data

Dec. 10, 2018 (RU) ................................ 2018143561
Nov. 27, 2019 (KR) ........................ 10-2019-0154559

(51) Int. Cl.
G06T 17/00 (2006.01)
G06T 7/11 (2017.01)
(Continued)

(52) U.S. Cl.
CPC ............... *G06T 17/00* (2013.01); *G06N 3/08* (2013.01); *G06Q 30/0269* (2013.01); *G06T 3/40* (2013.01);
(Continued)

(58) Field of Classification Search
CPC .... G06N 3/08; G06T 3/40; G06T 7/11; G06T 17/00; G06T 2207/30201; G06T 40/16;
(Continued)

(56) References Cited

U.S. PATENT DOCUMENTS 10,134,177 B2  11/2018  Feng et al.
10,970,520 B1   4/2021  Kim et al.
(Continued)

FOREIGN PATENT DOCUMENTS

CN  105631861 A  6/2016
CN  106600667 A  4/2017
(Continued)

OTHER PUBLICATIONS

Cao, Chen, et al. "3D shape regression for real-time facial animation." ACM Transactions on Graphics (TOG) 32.4 (2013): 1-10 (Year: 2013).*
(Continued)

*Primary Examiner* — Diane M Wills
(74) *Attorney, Agent, or Firm* — Jefferson IP Law, LLP

(57) ABSTRACT

Provided is a two-dimensional (2D) image processing method including obtaining a 2D image, processing the obtained 2D image by using a trained convolutional neural network (CNN) to obtain at least one camera parameter and at least one face model parameter from the 2D image, and generating a three-dimensional (3D) face model, based on the obtained at least one camera parameter and at least one face model parameter.

13 Claims, 11 Drawing Sheets

(51) Int. Cl.
| | |
|---|---|
| G06V 40/16 | (2022.01) |
| G06T 3/40 | (2006.01) |
| G06N 3/08 | (2023.01) |
| G06Q 30/0251 | (2023.01) |
| G06T 19/00 | (2011.01) |
| G06V 10/82 | (2022.01) |
| G06V 10/44 | (2022.01) |
| G06V 20/64 | (2022.01) |

(52) U.S. Cl.
CPC .............. *G06T 7/11* (2017.01); *G06T 19/006* (2013.01); *G06V 10/454* (2022.01); *G06V 10/82* (2022.01); *G06V 20/64* (2022.01); *G06V 40/16* (2022.01); *G06V 40/161* (2022.01); *G06V 40/171* (2022.01); *G06T 2207/20081* (2013.01); *G06T 2207/20084* (2013.01); *G06T 2207/30201* (2013.01)

(58) Field of Classification Search
CPC ........... G06T 2207/20081; G06T 2207/20084; G06V 40/161
See application file for complete search history.

(56) References Cited

U.S. PATENT DOCUMENTS

| | | | |
|---|---|---|---|
| 2004/0223631 | A1 | 11/2004 | Waupotutsch et al. |
| 2006/0067573 | A1 | 3/2006 | Parr et al. |
| 2016/0042548 | A1 | 2/2016 | Du et al. |
| 2016/0379041 | A1 | 12/2016 | Rhee et al. |
| 2017/0154461 | A1 | 6/2017 | Rhee et al. |
| 2017/0256093 | A1 | 9/2017 | Choi et al. |
| 2018/0032796 | A1 | 2/2018 | Kuharenko et al. |
| 2018/0068178 | A1 | 3/2018 | Theobalt et al. |
| 2018/0158240 | A1 | 6/2018 | Saito et al. |
| 2018/0182165 | A1 | 6/2018 | Zatepyakin |
| 2018/0197330 | A1 | 7/2018 | Wang |
| 2021/0012558 | A1* | 1/2021 | Li ........................ G06T 17/00 |

FOREIGN PATENT DOCUMENTS

| | | |
|---|---|---|
| CN | 107680155 A | 2/2018 |
| CN | 107680158 A | 2/2018 |
| CN | 108257139 A | 7/2018 |
| CN | 108537191 A | 9/2018 |
| CN | 108764024 A | 11/2018 |
| CN | 108960001 A | 12/2018 |
| CN | 108961410 A | 12/2018 |
| KR | 10-1759188 B1 | 7/2017 |
| KR | 10-1906431 B1 | 10/2018 |
| RU | 2 671 990 C1 | 11/2018 |

OTHER PUBLICATIONS

Feng Y, Wu F, Shao X, Wang Y, Zhou X. Joint 3d face reconstruction and dense alignment with position map regression network. InProceedings of the European conference on computer vision (ECCV) Sep. 2018 (pp. 534-551) (Year: 2018).*

Hassner T, Harel S, Paz E, Enbar R. Effective face frontalization in unconstrained images. InProceedings of the IEEE conference on computer vision and pattern recognition 2015 (pp. 4295-4304). (Year: 2015).*

Gao, Wen, et al. "Learning and synthesizing MPEG-4 compatible 3-D face animation from video sequence." IEEE Transactions on Circuits and Systems for Video technology 13.11 (2003): 1119-1128. (Year: 2003).*

Ruiz LZ et al., Human emotion detection through facial expressions for commercial analysis. In2017IEEE 9th International Conference on Humanoid, Nanotechnology, Information Technology, Communication and Control, Environment and Management (HNICEM) Dec. 1, 2017 (pp. 1-6). IEEE. (Year: 2017).*

Bejaoui, Hela, Haythem Ghazouani, and Walid Barhoumi. "Fully automated facial expression recognition using 3D morphable model and mesh-local binary pattern." Advanced Concepts for Intelligent Vision Systems: 18th International Conference, ACIVS 2017, Antwerp, Belgium, Sep. 18-21, 2017 (Year: 2017).*

Crispell Daniel et al., "Pix2Face: Direct 3D Face Model Estimation", 2017 IEEE International Conference on Computer Vision Workshops (ICCVW), IEEE, Oct. 22, 2017, pp. 2512-2518, XP033303722.

Zekun Hao et al., "Scale-Aware Face Detection", Arxiv.org, Cornell University Library, Jun. 29, 2017, XP080773606.

Feng-Ju Chang et al., "ExpNet: Landmark-Free, Deep, 3D Facial Expressions", Arxiv.org, Cornell University Library, Feb. 2, 2018, XP081214282.

Extended European Search Report dated Nov. 30, 2021, issued in European Patent Application No. 19894504.0.

Shaoqing Ren et al., "Face Alignment at 3000 FPS via Regressing Local Binary Features", Jun. 23-28, 2014, http://www.jiansun.org/papers/CVPR14_FaceAlignment.pdf.

Patrik Huber, "A lightweight header-only 3D Morphable Face Model fitting library in modern C++11/14", Aug. 4, 2020, https://github.com/patrikhuber/eos.

Patrik Huber et al., "A Multiresolution 3D Morphable Face Model and Fitting Framework", International Conference on Computer Vision Theory and Applications (visapp) 2016, Rome, Italy.

Justus Thies et al., "Face2Face: Real-time Face Capture and Reenactment of RGB Videos", Dec. 19, 2018, Communications of the ACM, vol. 62, Issue 1.

Yudong Guo et al., "Self-supervised CNN for Unconstrained 3D Facial Performance Capture from an RGB-D Camera", Aug. 16, 2018.

Boyi Jiang et al., "Deep Face Feature for Face Alignment and Reconstruction", Aug. 9, 2017.

International Search Report dated Mar. 25, 2020, issued in International Patent Application No. PCT/KR2019/017240.

Russian Office Action dated May 17, 2019, issued in Russian Patent Application No. 2018143561.

Chinese Office Action dated Mar. 9, 2023, issued in Chinese Patent Application No. 201980006687.0.

Chinese Office Action dated Aug. 9, 2023, issued in Chinese Patent Application No. 201980006687.0.

Chinese Office Action dated Nov. 20, 2023, issued in Chinese Patent Application No. 201980006687.0.

European Office Action dated Dec. 21, 2023, issued in European Patent Application No. 19 894 504.0.

* cited by examiner

METHOD FOR PROCESSING TWO-DIMENSIONAL IMAGE AND DEVICE FOR EXECUTING METHOD

TECHNICAL FIELD

The disclosure relates to a two-dimensional (2D) image processing method and a device for performing the method. More particularly, the disclosure relates to a method of generating a three-dimensional (3D) model of a face on a 2D image, and a device for performing the method.

BACKGROUND ART

Technology for generating a three-dimensional (3D) face model by extracting a face from a two-dimensional (2D) image is used in various fields.

However, because high-performance hardware is required due to the complexity of an algorithm, it may not be easy to implement the above technology by using only a mobile device without the support of additional hardware.

DESCRIPTION OF EMBODIMENTS

Solution to Problem

According to an aspect of the disclosure, a two-dimensional (2D) image processing method includes obtaining a 2D image, processing the obtained 2D image by using a trained convolutional neural network (CNN) to obtain at least one camera parameter and at least one face model parameter from the 2D image, and generating a three-dimensional (3D) face model, based on the obtained at least one camera parameter and at least one face model parameter.

BEST MODE

Figure 1:
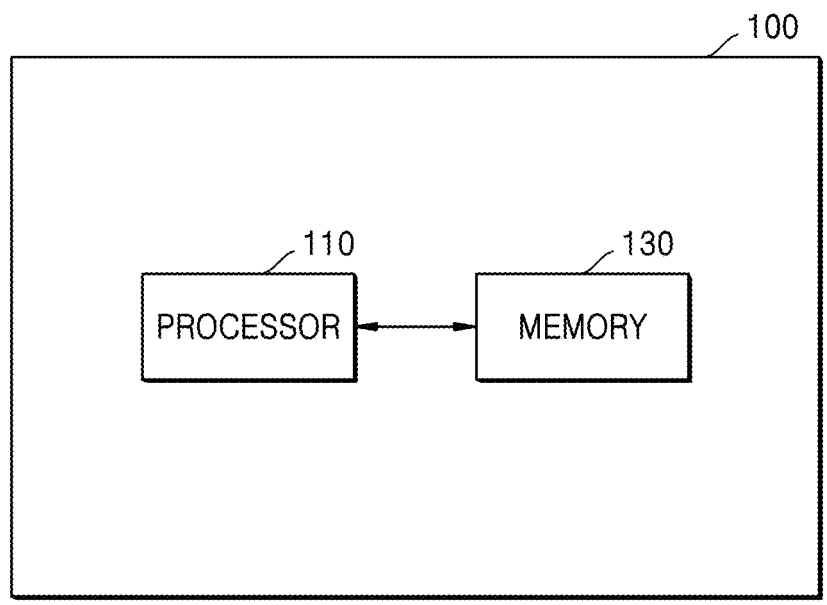
FIG. 1 is a block diagram of a two-dimensional (2D) image processing device according to an embodiment of the disclosure.

According to an aspect of the disclosure, a two-dimensional (2D) image processing method includes obtaining a 2D image, processing the obtained 2D image by using a trained convolutional neural network (CNN) to obtain at least one camera parameter and at least one face model parameter from the 2D image, and generating a three-dimensional (3D) face model, based on the obtained at least one camera parameter and at least one face model parameter.

The processing of the 2D image by using the trained CNN may include adjusting a size of the 2D image, detecting a face from the size-adjusted 2D image, indicating, with a bounding box, a face region including the detected face, cutting an image of the face region indicated by the bounding box, from the 2D image, generating a second image by adjusting a size of the cut image of the face region, marking at least one landmark of the face on the second image, and obtaining at least one camera parameter and at least one face model parameter that most closely match the at least one landmark.

The at least one camera parameter may be obtained by using non-linear optimization, and the at least one face model parameter may be obtained by using linear optimization.

The CNN may be trained in various manners.

The 3D face model may be generated by applying the at least one camera parameter and the at least one face model parameter to a 3D morphable face model.

The 2D image processing method may further include overlaying the generated 3D face model on a face region of the 2D image.

The overlaying may be performed using a pinhole camera model.

The 2D image processing method may further include processing the obtained 2D image by using the trained CNN to obtain at least one emotion parameter from the 2D image.

According to another aspect of the disclosure, a two-dimensional (2D) image processing device includes a memory storing one or more instructions, and a processor configured to execute the one or more instructions, wherein the processor is configured to obtain a 2D image, process the obtained 2D image by using a trained convolutional neural network (CNN) to obtain at least one camera parameter and at least one face model parameter from the 2D image, and generate a three-dimensional (3D) face model, based on the obtained at least one camera parameter and at least one face model parameter.

The processor may be configured to process the 2D image by using the trained CNN by adjusting a size of the 2D image, detecting a face from the size-adjusted 2D image, indicating, with a bounding box, a face region including the detected face, cutting an image of the face region indicated by the bounding box, from the 2D image, generating a second image by adjusting a size of the cut image of the face region, marking at least one landmark of the face on the second image, and obtaining at least one camera parameter and at least one face model parameter that most closely match the at least one landmark.

The at least one camera parameter may be obtained by using non-linear optimization, and the at least one face model parameter may be obtained by using linear optimization.

The CNN may be trained in various manners.

The 3D face model may be generated by applying the at least one camera parameter and the at least one face model parameter to a 3D morphable face model.

The processor may overlay the generated 3D face model on a face region of the 2D image.

The overlaying may be performed using a pinhole camera model.

The processor may process the obtained 2D image by using the trained CNN to obtain at least one emotion parameter from the 2D image.

According to another aspect of the disclosure, provided is a computer program product for causing, when executed, a computer to perform the methods.

According to another aspect of the disclosure, provided is a computer-readable recording medium having recorded thereon the computer program product.

MODE OF DISCLOSURE

One or more embodiments of the disclosure and methods of accomplishing the same may be understood more readily by reference to the following detailed description and the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art, and the disclosure will only be defined by the appended claims.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

Hereinafter, the disclosure will be described in detail by explaining embodiments of the disclosure with reference to the attached drawings. In the drawings, parts not related to embodiments of the disclosure are not illustrated for clarity of explanation.

FIG. 1 is a block diagram of a two-dimensional (2D) image processing device 100 according to an embodiment of the disclosure.

The 2D image processing device 100 according to an embodiment of the disclosure may include a processor 110 and a memory 130.

The processor 110 may obtain a 2D image, and process the obtained 2D image by using a trained convolutional neural network (CNN) to obtain at least one camera parameter and at least one face model parameter from the 2D image.

The 2D image may be a part of a video stream captured by a camera of a mobile computing device of a user in real time, or a part of a previously stored video stream.

In some embodiments, the 2D image processing device 100 may further include a photography unit for capturing a video stream, e.g., a camera.

In the disclosure, a CNN is a type of a deep neural network (DNN) that is an artificial neural network including multiple hidden layers between an input layer and an output layer, and may be a neural network including one or more convolutional layers and pooling layers, and fully connected layers.

The CNN has a structure appropriate to learn 2D data such as images, and may be trained using a backpropagation algorithm The CNN is one of representative models of the DNN broadly used in various application fields such as classification and detection of objects from images. In the disclosure, a CNN trained in various manners may be used.

The method, performed by the processor 110, of obtaining the at least one camera parameter and the at least one face model parameter from the 2D image will be described in detail below with reference to FIG. 3 and the like.

The processor 110 may generate a three-dimensional (3D) face model, based on the obtained at least one camera parameter and at least one face model parameter.

The memory 130 may store, for example, program instructions to be executed by the processor 110. The memory 130 may store instructions readable and executable by the processor 110 such that the processor 110 may execute the instructions to perform operations included in a 2D image processing method.

In an embodiment, the memory 130 may store the trained CNN.

In some embodiments of the disclosure, the 2D image processing device 100 may include a plurality of memories.

Although the processor 110 and the memory 130 are described as separate elements in the current embodiment, in some embodiments of the disclosure, the processor 110 and the memory 130 may be combined and implemented as a single element.

In addition, although the processor 110 and the memory 130 are located adjacent to each other in the 2D image processing device 100 in the current embodiment, entities for performing functions of the processor 110 and the memory 130 may not always be physically adjacent to each other and thus, according to another embodiment, the processor 110 and the memory 130 may be located in a distributed manner.

The 2D image processing device 100 is not limited to a physical device, and thus some functions of the 2D image processing device 100 may be implemented by software instead of hardware.

According to some embodiments of the disclosure, the 2D image processing device 100 may further include an outputter, a communication interface, a photography unit, etc.

Each element specified herein may include one or more components, and the name of the element may differ depending on the type of a device. In various embodiments, the device may include at least one of the elements specified herein, and some elements may be omitted or new elements may be added. In addition, some of the elements of the device according to various embodiments may be combined into a single entity capable of equally performing functions of the elements before being combined.

The device 100 may include other elements not illustrated in FIG. 1, e.g., a smartphone, tablet PC, virtual reality glasses, augmented reality glasses, a PC, a laptop computer, and a smart watch.

In another embodiment, a user computing device may include separate hardware units. In such an embodiment, each hardware unit may be responsible for each operation or sub-operation of a method according to the disclosure.

Figure 2:
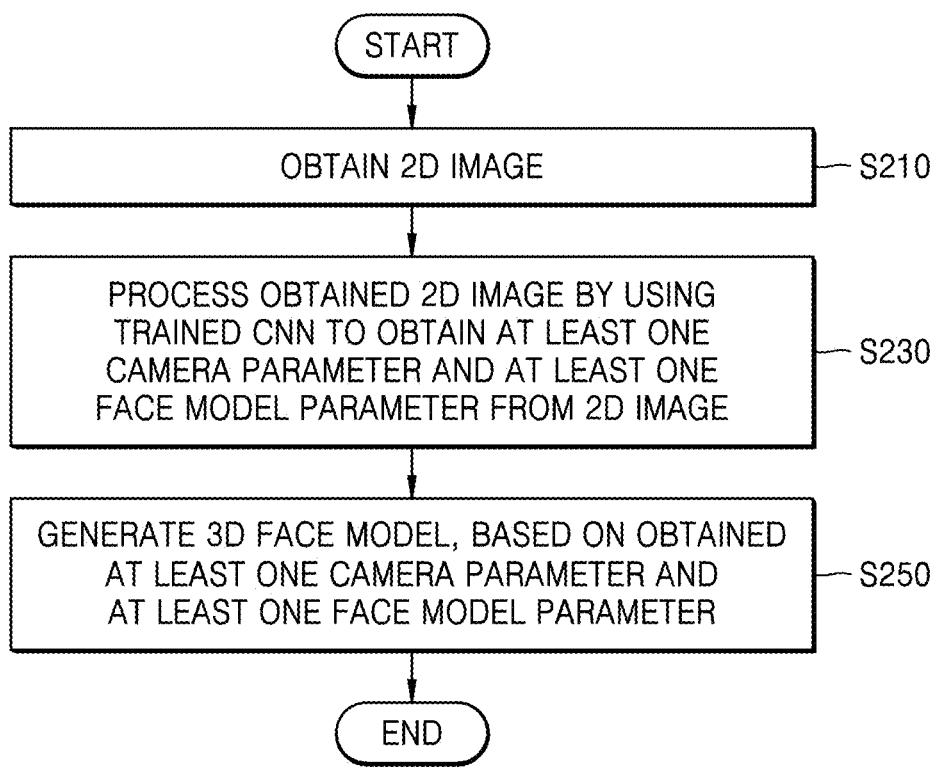
FIG. 2 is a flowchart of a 2D image processing method according to an embodiment of the disclosure.

FIG. 2 is a flowchart of a 2D image processing method according to an embodiment of the disclosure.

In operation S210, the device 100 may obtain a 2D image. The 2D image may be a part of a video stream captured by a camera of a mobile computing device of a user in real time, or a part of a previously stored video stream. Alternatively, the 2D image may be one or more images included in an image sequence downloaded from a network such as the Internet or a cloud network.

In operation S230, the device 100 may process the obtained 2D image by using a pre-trained CNN to obtain at least one camera parameter and at least one face model parameter.

Figure 4A:
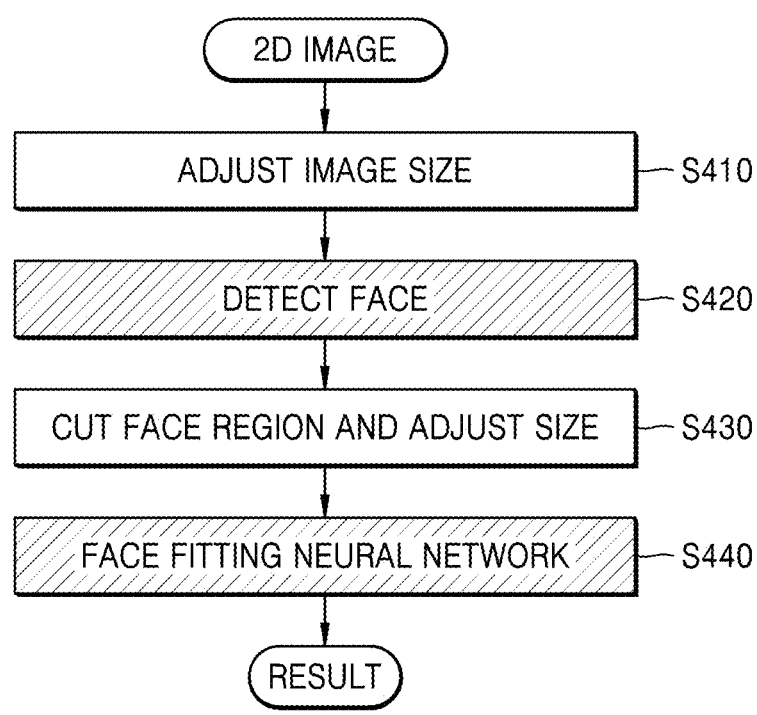
FIG. 4A is a flowchart of a data processing method of a trained CNN, according to an embodiment of the disclosure.
Figure 4B:
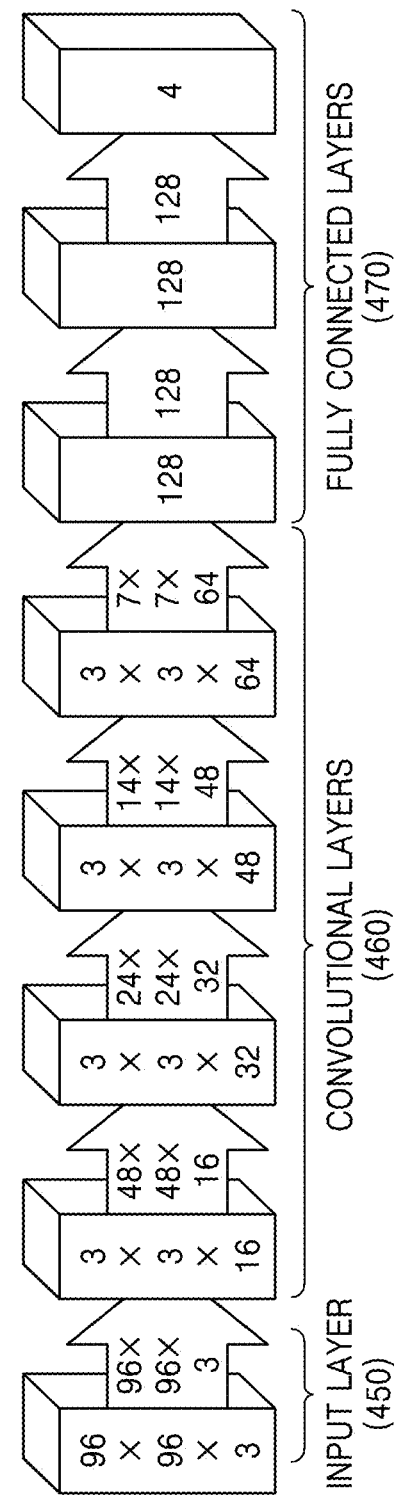
FIG. 4B illustrates a structure of a CNN used according to an embodiment of the disclosure.
Figure 4C:
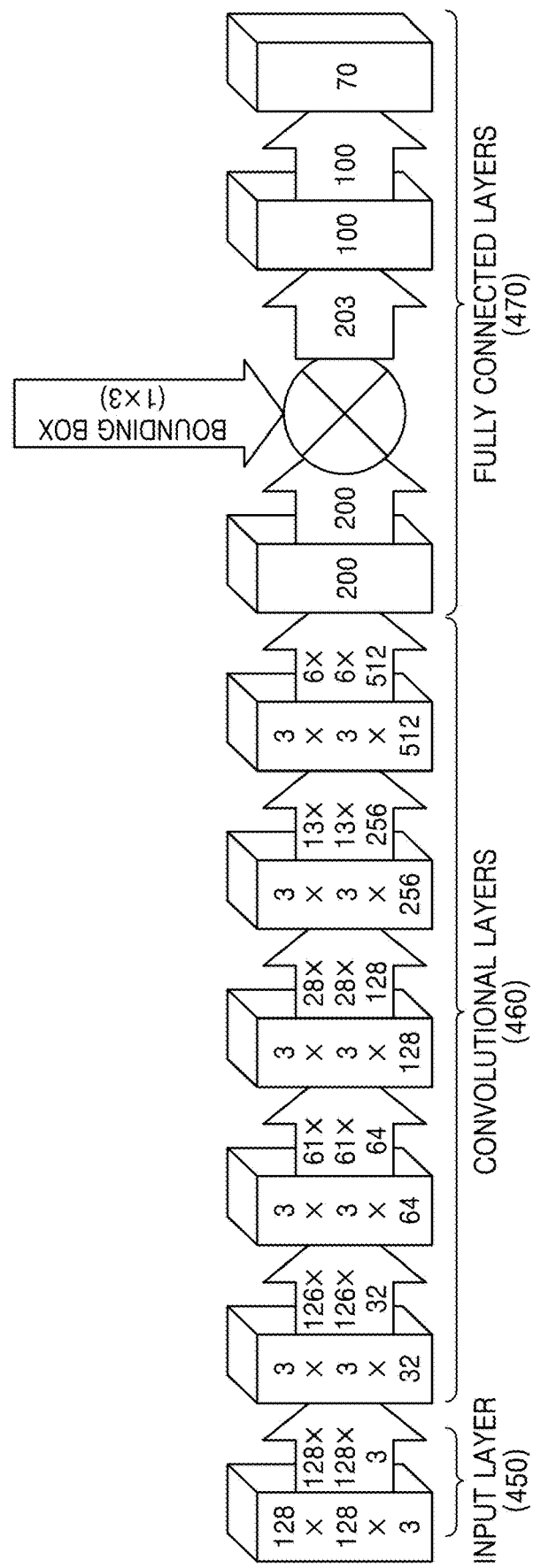
FIG. 4C illustrates another structure of a CNN used according to an embodiment of the disclosure.

The CNN may have the structure as illustrated in FIG. 4B or 4C. The CNN may be configured to infer camera parameters and face model parameters. Specifically, the CNN may detect a face and infer and obtain the above-mentioned parameters, based on the detected face.

Providing of a CNN having an additional capability of detecting a face from an image has enabled avoidance of a resource-intensive procedure for face detection. The detection of the face from the image by using the CNN according to the disclosure is less resource-intensive, compared to the related arts.

In operation S250, the device 100 may generate a 3D face model, based on the obtained at least one camera parameter and at least one face model parameter.

In an embodiment, the device 100 may generate the 3D face model by applying the at least one camera parameter and the at least one face model parameter to a 3D morphable face model.

In the disclosure, a morphable face model may refer to a statistical face primary component analysis (PCA) model.

This model may be represented by M=N+B, where N denotes a neutral model and is referred to as a default 3D face model, e denotes a face shape parameter, and B denotes a shape basis. This model may also be represented by a multidimensional normal distribution having a center at point N and having a set of unique vectors B of a covariance matrix. A column of each vector matrix B may correspond to an eigenvalue eigen$_i$ responsible for informational importance of this vector.

To explain an emotion reflection model, the above formula M may be modified into $\hat{M}=N+B^\epsilon+A\alpha$. In this formula, A denotes an emotion basis and a denotes an emotion parameter vector.

In some embodiments, the method may further include an operation in which the device 100 overlays the generated 3D face model on a face region of the 2D image. In this overlay procedure, a simplified pinhole camera model may be used.

In the disclosure, the pinhole camera model is a projection of the mathematical relationship between coordinates in a 3D space, into an image hologram.

This may be represented by Y=($t_x$, $t_y$, $t_z$, α, β, γ, f), where ($t_x$, $t_y$, $t_z$) denotes a translation on each axis, (α, β, γ) denotes a rotation angle, and f denotes a focal length.

The projection may be derived as $$\dot{x} = \frac{f \cdot (R(\alpha, \beta, \gamma)x + t_x)}{(R(\alpha, \beta, \gamma)x)_z + t_z},$$

where x denotes an original coordinate point, $\dot{x}$ denotes a projected coordinate point, f denotes a focal length, and R(α, β, γ) denotes a rotation matrix.

When a parameter of ∈ the morphable face model and parameters of the simplified pinhole camera model have fixed values, a series of points will be derived from a 3D space R(α, β, γ)(∈)+t and they will be referred to as a 3D face model.

Figure 3:
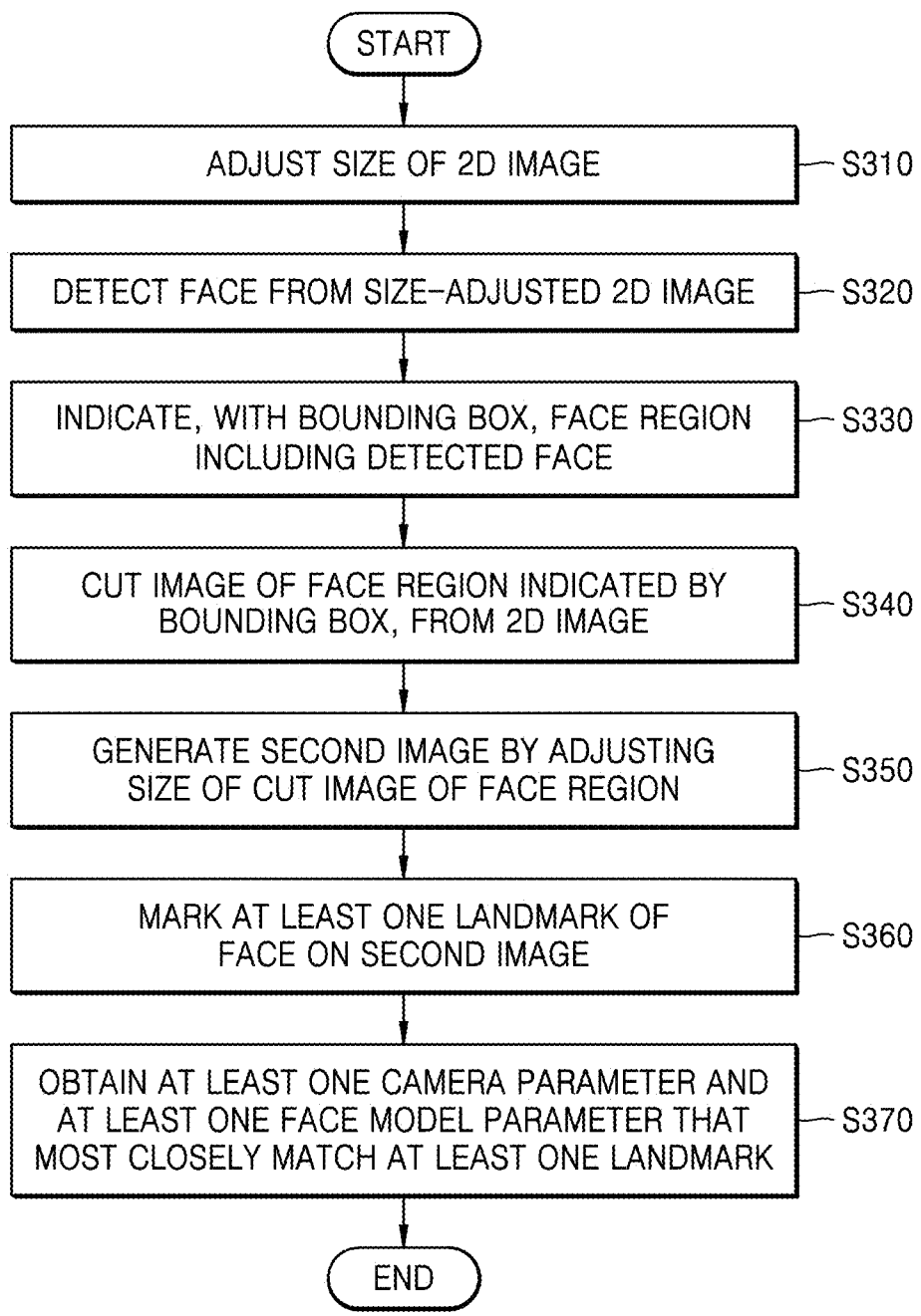
FIG. 3 is a flowchart of a data processing method performed by using a trained convolutional neural network (CNN) for processing a 2D image, according to an embodiment of the disclosure.

FIG. 3 is a flowchart of a data processing method performed by using a trained CNN for processing a 2D image, according to an embodiment of the disclosure.

In operation S310, the CNN may adjust the size of the 2D image obtained in operation S210 of FIG. 2. The CNN may increase or reduce the size of the 2D image.

In operation S320, the CNN may detect a face from the size-adjusted 2D image. In operation S330, the CNN may indicate, with a bounding box, a face region including the detected face. The bounding box for each detected face may be implied to determine a face location in an image space. In some embodiments, the bounding box may be a box having a size slightly larger or smaller than the face.

In operation S340, the CNN may cut an image of the face region indicated by the bounding box. Although the image of the face region is cut based on the bounding box in the current embodiment, operation S340 may be performed in a different manner In operation S350, the CNN may generate a second image by adjusting the size of the cut image of the face region. The CNN may generate the second image by increasing or reducing the size of the cut image of the face region.

In an embodiment, the CNN may generate the second image by reducing the size of the cut image of the face region to a certain size of n×n, e.g., 512×512, 256×256, 128×128, or another size.

In operation S360, the CNN may mark at least one landmark of the face on the second image. Landmarks refer to features of the face, e.g., corners of the eyes or the mouth, a tip of the nose, and points along the edges of the face, the nose, the eyes, and the mouth. However, the landmarks are not limited thereto.

In an embodiment, the landmarks may be manually marked. In another embodiment, the landmarks may be automatically marked by using, for example, active shape model algorithms, cascade algorithms, or neural network approach. However, the algorithms used to automatically mark the landmarks are not limited to the above-mentioned examples.

In another embodiment, operation S360 may be combined with operation S320 and/or operation S330. This is because the detection of the face region and the generation of the bounding box therefor may be implied by the marked face landmarks.

In operation S370, the CNN may obtain at least one camera parameter and at least one face model parameter that most closely match the at least one landmark.

In operation S370, the CNN may obtain the at least one camera parameter through non-linear optimization. The non-linear optimization may use a Gauss-Newton algorithm, a Levenberg-Marquardt algorithm, or a gradient descent algorithm, but is not limited thereto.

In addition, the CNN may obtain the at least one face model parameter through linear optimization. The at least one face model parameter may include a shape parameter. The CNN may reduce required hardware resources by using linear optimization to obtain the at least one face model parameter. Therefore, the 2D image processing device 100 according to an embodiment of the disclosure may generate a 3D face model in a mobile device without using additional hardware. A detailed description thereof will be provided below with reference to FIG. 7.

In another embodiment, the method may further include an operation in which the CNN generates a 3D face model that most closely matches the face landmarks.

FIG. 4A is a flowchart of a data processing method of a trained CNN, according to an embodiment of the disclosure.

FIG. 4A is a simplified version of the flowchart of FIG. 3, FIG. 4B illustrates a structure of the CNN in operation S420 of FIG. 4A, according to an embodiment of the disclosure, and FIG. 4C illustrates a structure of the CNN in operation S440 of FIG. 4A, according to an embodiment of the disclosure.

In the embodiment of FIG. 4A, the CNN may receive a plurality of 2D images and perform operations S410, S420, and S430. In this case, a plurality of images and bounding boxes therefor may be input in operation S440.

In the embodiment of FIG. 4B, the CNN may include an input layer 450, convolutional layers 460, and fully connected layers 470.

The CNN may input an image having a size of 96×96, to the input layer 450.

The convolutional layers 460 may be designed to derive features of a 2D image.

The CNN may autonomously add new layers. Because a face detection capability of the CNN may be improved when new layers are added, face detection may be enabled without using an additional algorithm In FIG. 4C, the CNN may include the input layer 450, the convolutional layers 460, and the fully connected layers 470.

The CNN may input an image having a size of 128×128, to the input layer 450.

In addition, the CNN may additionally input a bounding box to the second last fully connected layer 470 as illustrated in FIG. 4C. The input bounding box may be concatenated with the second last input data of the fully connected layers 470. The convolutional layers 460 may be designed to derive features of a 2D image. However, they may not be designed to work with macro-features such as bounding boxes.

The bounding boxes are input to the fully connected layers 470 in the current embodiment, but are not limited thereto.

In another embodiment, when the number of the fully connected layers 470 is increased and thus non-linearity is increased, diversity of functions enabled by this CNN structure may be increased.

To execute input, at least one new fully connected layer 470 may be added to the CNN structure to provide the CNN with a capability of using bounding box parameters, the CNN may more accurately infer camera parameters Y=(tx, ty, tz, α, β, γ, f).

The device 100 may obtain, for example, a location of a face, a direction of the face, and locations of face landmarks from the 2D image by using the CNN illustrated in FIGS. 4B and 4C.

Figure 5:
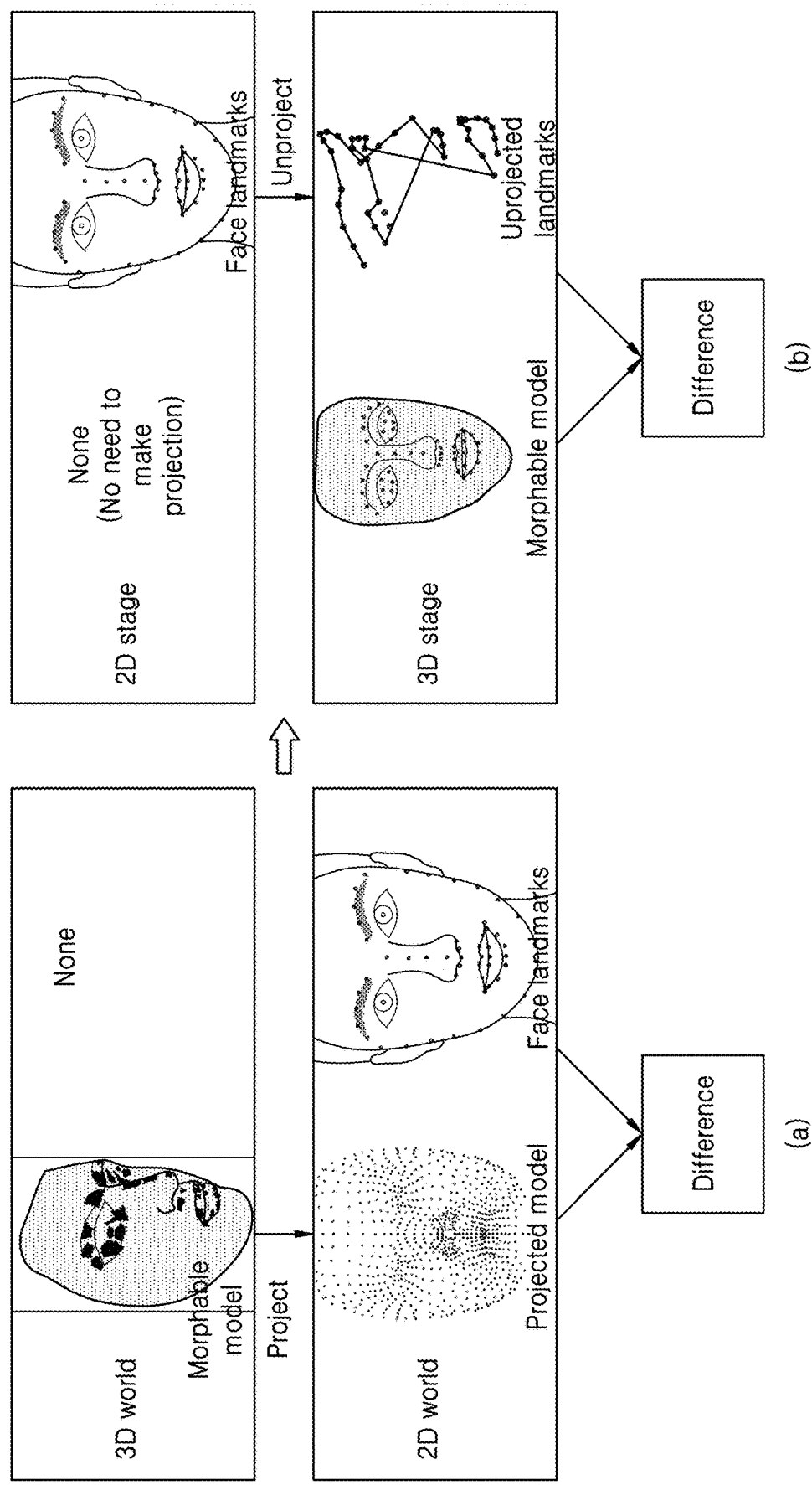
FIG. 5 illustrates an example of the difference between a 2D image processing method according to an embodiment of the disclosure and an existing method.

FIG. 5 illustrates an example of the difference between a 2D image processing method according to an embodiment of the disclosure, and an existing method.

(A) illustrates an existing face alignment optimization algorithm and (b) illustrates a face alignment optimization algorithm according to an embodiment of the disclosure.

Compared to (a) in which a 2D model generated by projecting a 3D morphable face model is compared to landmarks detected from a 2D image, in (b), landmarks directly detected from a 2D image without projection are compared to a 3D morphable face model.

The device 100 may increase a speed of executing the optimization algorithm, by using the method of (b).

Figure 6:
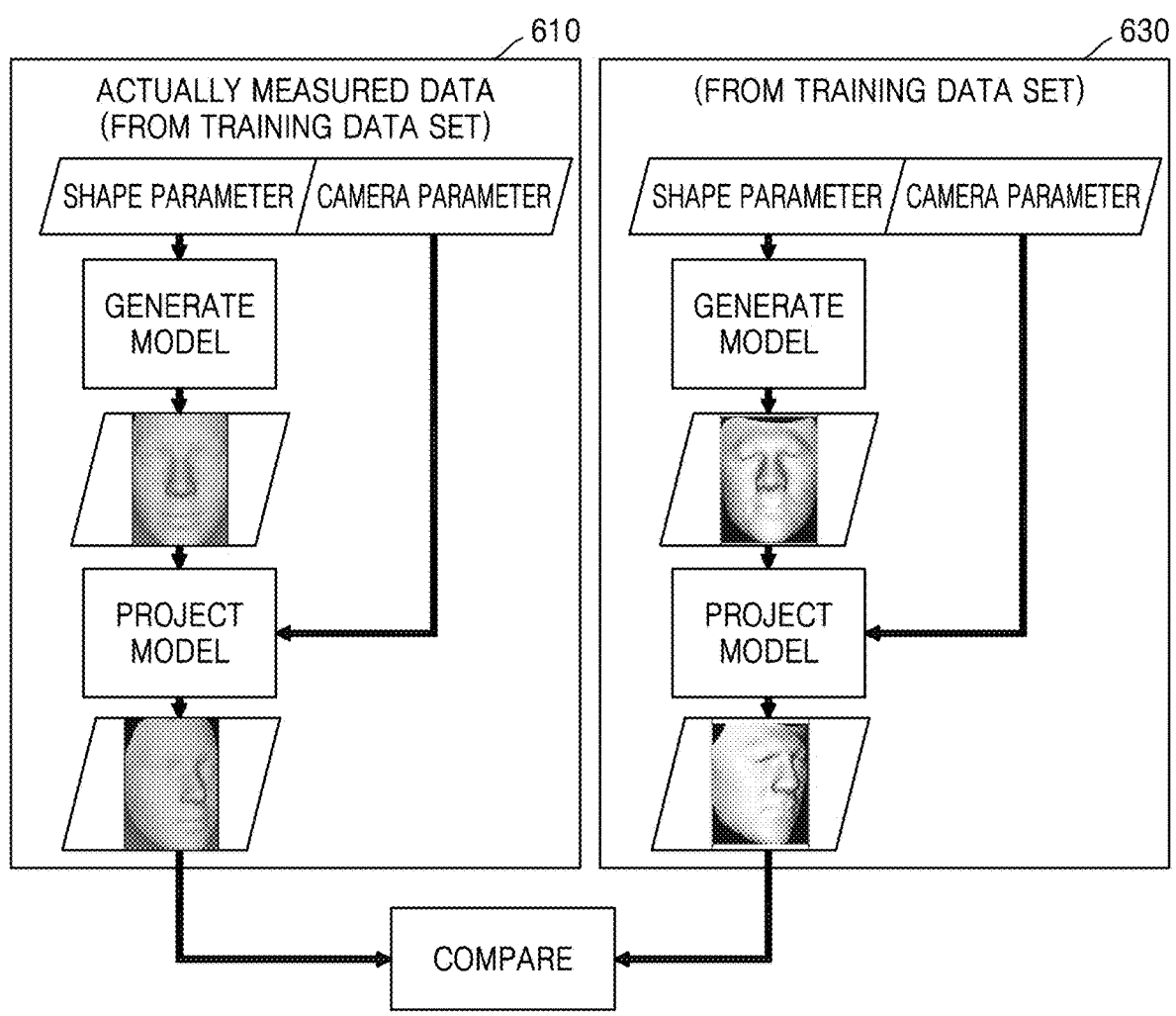
FIG. 6 is a flowchart of a CNN training method according to an embodiment of the disclosure.

FIG. 6 is a flowchart of a CNN training method according to an embodiment of the disclosure.

A CNN may be trained in various manners.

In an embodiment, the CNN may be trained based on training data such as a 3D morphable face model, a series of images and bounding boxes corresponding to the series of images, and camera parameters and model parameters that most closely match landmarks.

In this case, by providing the CNN with a capability of inputting a 2D image, at least one camera parameter and at least one model parameter may be extracted as actually measured data from the input 2D image (610).

In addition, the device 100 may obtain at least one camera parameter and at least one model parameter from a 2D image by executing the CNN, based on the method of FIGS. 2 and 3 (630).

When the difference between the actually measured data 610 and the data obtained based on the algorithm by the CNN (630) is large, a loss function may be additionally used in a CNN learning operation.

Determination of whether the difference between the actually measured data and the data obtained based on the algorithm by the CNN is large may be performed by comparing a 3D face model generated based on at least one camera parameter and at least one model parameter that most closely match landmarks of each of a few face images input due to CNN training, to a 3D face model generated based on at least one camera parameter and at least one model parameter obtained from each image by the CNN, by using the difference in the L2 standard.

In another embodiment, the CNN may be trained using a standard for the difference between projections of face landmarks, as a loss function.

In another embodiment, the CNN may be additionally trained by using an Adam optimization algorithm Alternatively, the CNN may be trained by using an L2 standard for the difference in camera parameters and an L2 standard for the difference in model parameters. In this case, the L2 standard may be added as the difference in weight corresponding to a macro parameter of teaching.

Figure 7:
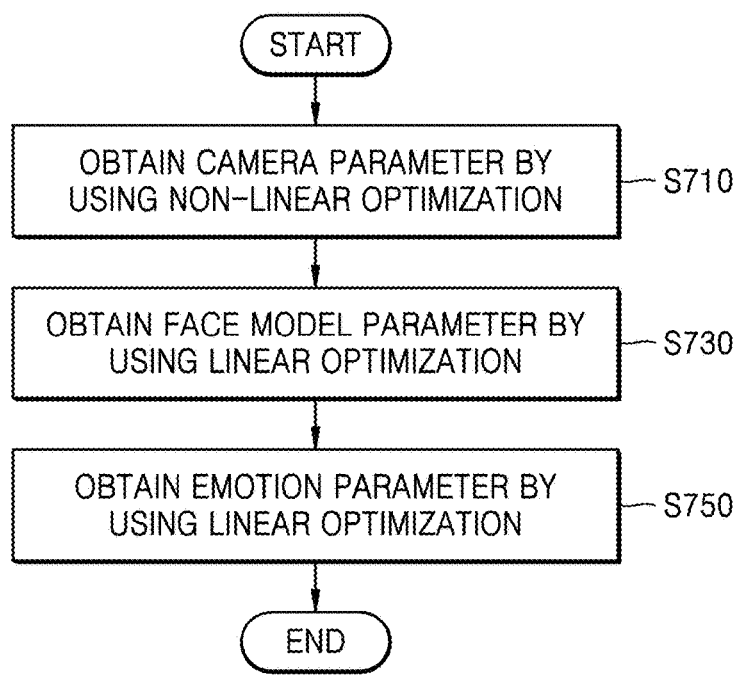
FIG. 7 is a flowchart of a method of additionally obtaining an emotion parameter, according to an embodiment of the disclosure.

FIG. 7 is a flowchart of a method of additionally obtaining an emotion parameter, according to an embodiment of the disclosure.

In operation S710, the device 100 may obtain at least one camera parameter by using non-linear optimization.

In operation S730, the device 100 may obtain at least one face model parameter by using linear optimization.

The linear optimization for obtaining the model parameters may be represented by Equation 1 as shown in the following function.

$$F(\hat{\phi}_i(\epsilon)) = \sum_{i=0}^{n} \hat{\phi}_i(\epsilon) \rightarrow \min_{\epsilon} \hat{\phi}_i(\epsilon) = \quad \text{Equation 1}$$

$$\left\| f \cdot ((RM_i(\epsilon))_{x,y} + t_{x,y}) - p_i \cdot ((RM_i(\epsilon))_z + t_z) \right\|_2^2,$$

In this function, $\hat{\phi}_i(\epsilon)$ denotes the L2 standard, and $p_i=(p_x, p_y)^T$ denotes an $I^{th}$ point of a model explained by $M=N+B^\epsilon$, where N denotes a neutral 3D face model, B denotes a shape basis, $\epsilon$ denotes a face shape parameter, and $\epsilon \in \mathbb{R}^{55}$ denotes camera parameters.

In addition, R denotes a rotation matrix having parameters ($\alpha$, $\beta$, $\gamma$), $t_{x,y,z}$ denotes a translation, and f denotes a focal length.

Instead of a traditional non-linear optimization problem, a solution to a linear optimization problem for finding model parameters may particularly reduce requirements for system resources required to execute an existing method.

The model parameters are linear combination coefficients $\epsilon$ used to generate a model. To solve this problem, camera parameters are regarded as constants.

To solve an optimization problem, configuration of a system of a linear equation using Equation 1 and solution of the problem by using least squares are essential. A solution to the system of the linear equation will serve as a solution to the optimization problem.

In an embodiment, regularization of preferable parameters of a morphable face model may be further performed. The regularization may be performed based on the following formula.

$$reg(\epsilon) = \frac{1}{2} \sum_{i=0}^{n} \frac{\epsilon_i}{eigen_i^2}$$

In this formula, $\epsilon_i$ denotes an $i^{th}$ parameter to be optimized and $eigen_i$ denotes an eigenvalue of an $i^{th}$ base vector. Then, a completed optimization formula (formula 1) may be as shown below.

$$F(\hat{\phi}(\epsilon)) = \sum_{i=0}^{n} \hat{\phi}_i(\epsilon) + reg(\epsilon) \quad \text{Formula 1}$$

In another embodiment, an existing method of processing a video stream and parameters of a morphable face model may be found in a plurality of images rather than a single image.

In this case, Equation 1 may be written as shown below.

$$\hat{F}(\phi(\epsilon)) = \sum_{k=0}^{m} \sum_{i=0}^{n} \hat{\phi}_i^{(k)}(\epsilon) + reg(\epsilon),$$

where k denotes an image number.

In operation S750, the device 100 may obtain at least one emotion parameter by using linear optimization.

Generation of a 3D face model based on camera parameters, morphable face model parameters, and emotion parameters that most closely match landmarks may be performed by solving a linear optimization problem by using Equation 2 shown below.

$$F(\phi(\epsilon, \alpha)) = \sum_{i=0}^{n} \phi_i(\epsilon, \alpha) \rightarrow \min_{\alpha} \hat{\phi}_i(\epsilon, \alpha) = \quad \text{Equation 2}$$

$$\left\| f \cdot ((R\hat{M}_i(\epsilon, \alpha))_{x,y} + t_{x,y}) - p_i \cdot ((R\hat{M}_i(\epsilon, \alpha))_z + t_z) \right\|_2^2$$

In this equation, $\hat{\phi}_i(\epsilon, \alpha)$ denotes the L2 standard, $p_i=(p_x, p_y)^T$ denotes an $i^{th}$ landmark, and $M_i(\epsilon,\alpha)=(M_x,M_y,M_z)^T$ denotes an $i^{th}$ point of an emotion reflection model explained by a formula $\hat{M}=N+B^\epsilon+A\alpha$ (where N denotes a neutral 2D face model, B denotes a face model, $\epsilon$ denotes face model parameters, $\epsilon \in \mathbb{R}^{55}$, A denotes an emotion basis, and $\alpha$ denotes an emotion parameter vector).

The model parameters are linear combination coefficients $\epsilon$ of emotion basis vectors, and are used to generate a model. To solve this problem, the camera parameters and the face model parameters are regarded as constants.

To solve an optimization problem, configuration and solution of a system of a linear equation based on Equation 2 are essential. A solution to the system of the linear equation will serve as a solution to the optimization problem.

Figure 8:
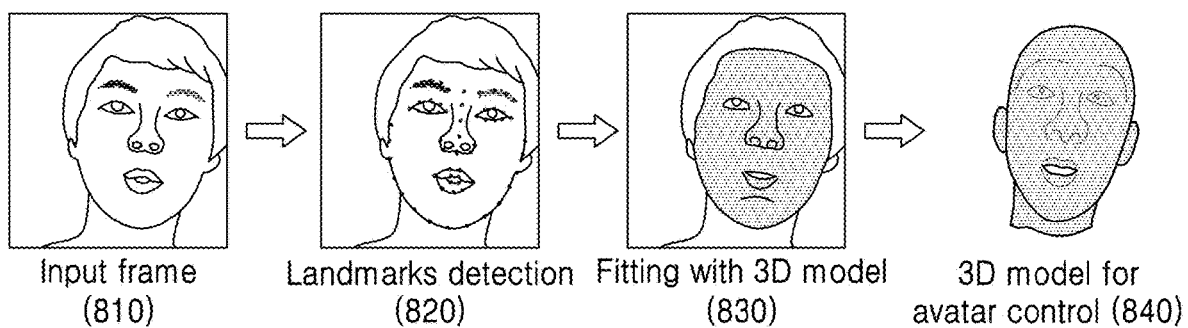
FIG. 8 illustrates an example of generating a three-dimensional (3D) avatar, based on a 2D image, according to an embodiment of the disclosure.

FIG. 8 illustrates an example of generating a 3D avatar, based on a 2D image, according to an embodiment of the disclosure.

The device 100 may obtain a 2D image (810), and detect landmarks from the obtained 2D image (820). The device 100 may generate a 3D face model by using the method described above in relation to FIGS. 2 and 3 (830).

Furthermore, the device 100 may generate a 3D avatar similar to a face detected from the 2D image, based on the generated 3D face model (840).

In some embodiments, the generated 3D avatar may mimic habits, motion, etc. of a user. In some embodiments, the device 100 may control the generated 3D avatar to detect motion of the user and move similarly to the detected motion of the user.

In another embodiment, the device 100 may use data about habits, motion, facial expressions, etc. of the user, in a security and authentication system. For example, the security system may use data about unique habits, motion, facial expressions, etc. of the user, for door security, document security, mobile device security, etc.

Figure 9:
FIG. 9 illustrates an example in which a 2D image processing device obtains an emotion parameter from a captured image of a passerby and provides an appropriate advertisement, according to an embodiment of the disclosure.

FIG. 9 illustrates an example in which the 2D image processing device 100 obtains an emotion parameter from a captured image of a passerby and provides an appropriate advertisement, according to an embodiment of the disclosure.

The device 100 may obtain an image of a user by using an embedded photography unit or an external photography device.

In an embodiment, the device 100 may obtain additional information about a face 910 of the user by performing the method according to the embodiments of FIG. 2 and the like on the obtained 2D image, and provide an advertisement of a product or service, based on the obtained additional information.

For example, the device 100 may obtain an emotion parameter of the user by performing the method according to the embodiments of FIGS. 2 and 7 on the obtained 2D image.

The device 100 may determine a feeling of the user by using the obtained emotion parameter, and provide an advertisement of a product or service, based on the determined feeling of the user.

As another example, the device 100 may obtain additional information of the user, e.g., an approximate age, a skin color, a skin tone, facial features, and a face size, by performing the method according to the embodiments of FIGS. 2 and 7 on the obtained 2D image.

The device 100 may provide an advertisement of a user-customized product or service, based on the obtained additional information.

The advertisement may be provided using a display inside the device 100 or using a display outside the device 100.

Figure 10:
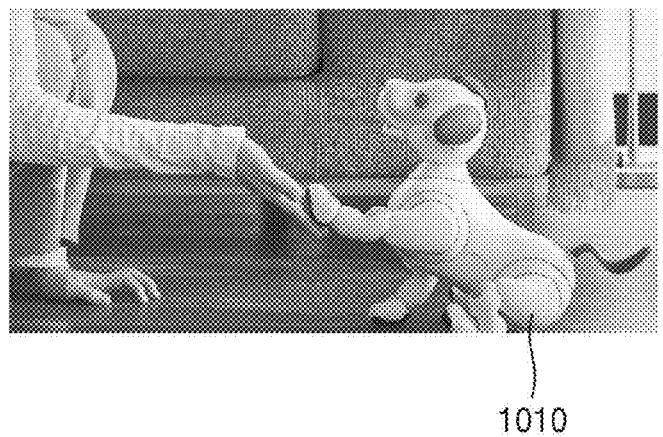
FIG. 10 illustrates an example in which a robot pet communicates with a user by obtaining an emotion parameter from a captured image of the user, according to an embodiment of the disclosure.

FIG. 10 illustrates an example in which a robot pet 1010 communicates with a user by obtaining an emotion parameter from a captured image of the user, according to an embodiment of the disclosure.

In another embodiment, in addition to the robot pet 1010, the device 100 may be a device such as a cordless cleaner, a drone, or an electronic secretary, or a separate device connected to the device.

The device 100 may obtain an image of a user by using an embedded photography unit or an external photography device.

In an embodiment, the device 100 may obtain an emotion parameter of the user by performing the method according to the embodiments of FIGS. 2 and 7 on the obtained 2D image.

The device 100 may determine a feeling of the user by using the obtained emotion parameter, and communicate with the user by performing a certain function, based on the determined feeling of the user.

For example, when the user feels bad, the robot pet 1010 may be controlled to make a comforting gesture.

Figure 11:
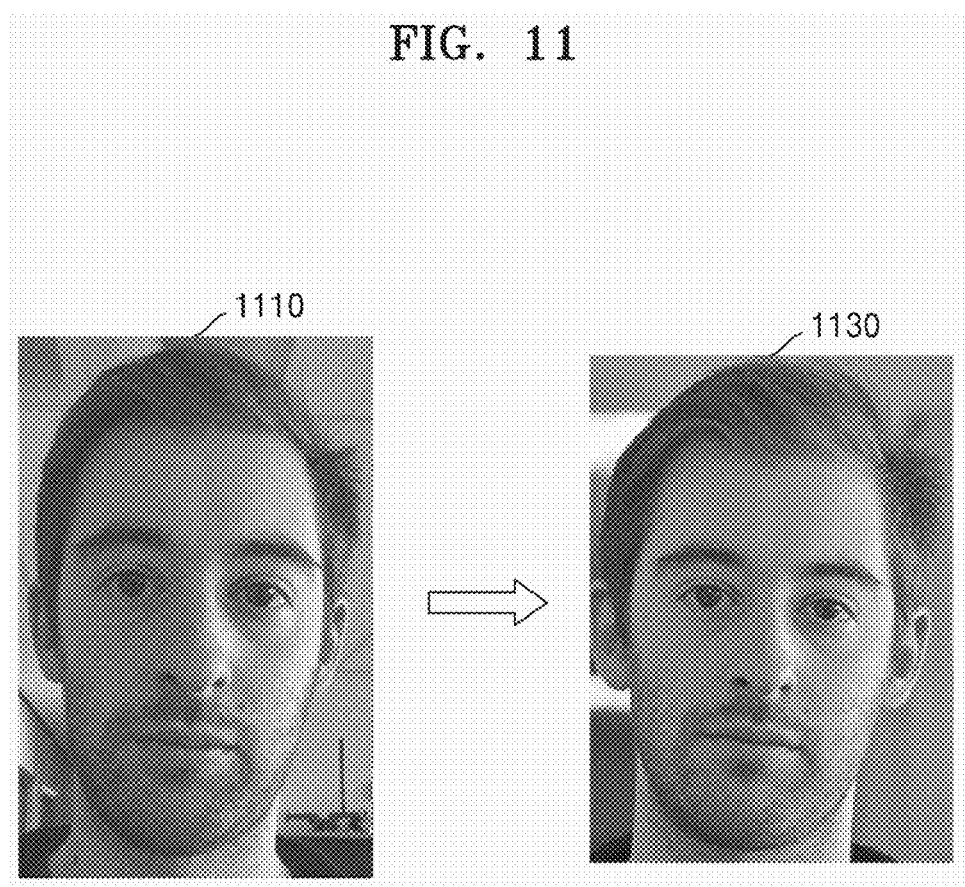
FIG. 11 illustrates an example of correcting perspective distortion, based on a generated 3D face model, according to an embodiment of the disclosure.

FIG. 11 illustrates an example of correcting perspective distortion, based on a generated 3D face model, according to an embodiment of the disclosure.

In the current embodiment, the device 100 may generate a 3D face model of a user by performing the method according to the embodiments of FIGS. 2 and 3 on an obtained 2D image 1110.

The device 100 may obtain a 2D image 1130 in which perspective distortion of the original 2D image 1110 is corrected, by overlaying the generated 3D face model on a face region of the 2D image.

The overlaying of the 3D face model on the face region of the 2D image may be performed using a pinhole camera model.

In an embodiment, correction of perspective distortion may be used for beauty applications, digital mirrors, digital makeup, etc.

The method of the disclosure may be performed by a processor, an application-specific integrated circuit (ASIC), a field-programmable gate array (FPGA), or a system-on-chip (SoC). The disclosed method may be performed by a storage medium storing instructions executable by a computer, and capable of performing the method of the disclosure when executed by a processor of the computer.

A machine-readable storage medium may be provided in the form of a non-transitory storage medium. When the storage medium is 'non-transitory', it merely means that the storage medium does not include signals (e.g., electromagnetic waves) and it does not limit that data is semi-permanently or temporarily stored in the storage medium. For example, the 'non-transitory storage medium' may include a buffer temporarily storing data.

According to an embodiment, the methods disclosed herein may be included and provided in a computer program product. The computer program product may be traded between a seller and a purchaser/buyer as a commercial product. The computer program product may be distributed in the form of a machine-readable storage medium (e.g., a compact disc read-only memory (CD-ROM)), or be distributed online (e.g., downloaded or uploaded) through an application store (e.g., Google Play™) or directly between two user devices (e.g., smartphones). For online distribution, at least a part of the computer program product (e.g., a downloadable application) may be at least temporarily stored in a machine-readable storage medium, e.g., a memory of a server of a manufacturer, a server of an application store, or a relay server, or be temporarily created.

While the disclosure has been particularly shown and described with reference to embodiments thereof, it will be understood by one of ordinary skill in the art that various changes in form and details may be made therein without departing from the scope of the disclosure. Therefore, it should be understood that the afore-described embodiments are illustrative in all aspects and do not limit the disclosure. For example, each element described as a single element may be implemented in a distributed manner and, likewise, elements described as distributed elements may be implemented in a combined manner.

It should be understood that the scope of the disclosure is defined by the following claims rather than the above description of embodiments and that all modifications and alternatives derived from the claims and their equivalents fall within the scope of the disclosure.

The invention claimed is:

1. A two-dimensional (2D) image processing method comprising:

obtaining a 2D image;

processing the obtained 2D image by using a trained convolutional neural network (CNN) to obtain at least one camera parameter, at least one face model parameter and at least one emotion parameter from the 2D image;

generating a three-dimensional (3D) face model, based on the obtained at least one camera parameter and at least one face model parameter;

determining a feeling of a user by using the obtained at least one emotion parameter; and providing an advertisement of a product or service, based on the determined feeling of the user, wherein the obtained at least one emotion parameter is based on predefined landmarks of the 2D image compared to a 3D morphable face model, and wherein the processing of the 2D image by using the trained CNN comprises:

adjusting a size of the 2D image, detecting a face from the size-adjusted 2D image, indicating, with a bounding box, a face region comprising the detected face, cutting an image of the face region indicated by the bounding box, from the 2D image, generating a second image by adjusting a size of the cut image of the face region, marking at least one landmark of the face on the second image, and obtaining at least one camera parameter and at least one face model parameter that most closely match the at least one landmark.

2. The 2D image processing method of claim 1, wherein the at least one camera parameter is obtained by using non-linear optimization, and wherein the at least one face model parameter is obtained by using linear optimization.

3. The 2D image processing method of claim 1, wherein the CNN is trained in various manners.

4. The 2D image processing method of claim 1, wherein the 3D face model is generated by applying the at least one camera parameter and the at least one face model parameter to a 3D morphable face model.

5. The 2D image processing method of claim 1, further comprising overlaying the generated 3D face model on a face region of the 2D image.

6. The 2D image processing method of claim 5, wherein the overlaying is performed using a pinhole camera model.

7. The 2D image processing method of claim 1, wherein the using of the CNN is based on training data that includes at least one of a 3D morphable face model, a series of images and bounding boxes corresponding to the series of images, or camera parameters and model parameters that match landmarks.

8. A two-dimensional (2D) image processing device comprising:
a memory storing one or more instructions; and
a processor configured to execute the one or more instructions,
wherein the processor is configured to:
obtain a 2D image,
process the obtained 2D image by using a trained convolutional neural network (CNN) to obtain at least one camera parameter, at least one face model parameter and at least one emotion parameter from the 2D image,
generate a three-dimensional (3D) face model, based on the obtained at least one camera parameter and at least one face model parameter,
determine a feeling of a user by using the obtained at least one emotion parameter, and
provide an advertisement of a product or service, based on the determined feeling of the user,
wherein the obtained at least one emotion parameter is based on predefined landmarks of the 2D image compared to a 3D morphable face model, and
wherein the processor is further configured to:
process the 2D image by using the trained CNN by adjusting a size of the 2D image,
detect a face from the size-adjusted 2D image,
indicate, with a bounding box, a face region comprising the detected face
cut an image of the face region indicated by the bounding box, from the 2D image,
generate a second image by adjusting a size of the cut image of the face region,
mark at least one landmark of the face on the second image, and
obtain at least one camera parameter and at least one face model parameter that most closely match the at least one landmark.

9. The 2D image processing device of claim 8, wherein the at least one camera parameter is obtained by using non-linear optimization, and the at least one face model parameter is obtained by using linear optimization.

10. The 2D image processing device of claim 8, wherein the CNN is trained in various manners.

11. The 2D image processing device of claim 8, wherein the 3D face model is generated by applying the at least one camera parameter and the at least one face model parameter to a 3D morphable face model.

12. The 2D image processing device of claim 8, wherein the generated 3D face model is overlaid on a face region of the 2D image.

13. A non-transitory computer-readable recording medium having recorded thereon a computer program for executing the method of claim 1.

* * * * *